(12) United States Patent
Thorson et al.

(10) Patent No.: US 8,091,081 B2
(45) Date of Patent: Jan. 3, 2012

(54) METHOD, SYSTEM, AND PRODUCT FOR UPGRADING SOFTWARE OBJECTS USING INHERENCY

(75) Inventors: Peter Alan Thorson, Oakland, CA (US); Bharat Jindal, San Mateo, CA (US)

(73) Assignee: Siebel Systems, Inc., San Mateo, CA (US)

( * ) Notice: Subject to any disclaimer, the term of this patent is extended or adjusted under 35 U.S.C. 154(b) by 1351 days.

(21) Appl. No.: 11/400,797

(22) Filed: Apr. 7, 2006

(65) Prior Publication Data

US 2007/0226728 A1   Sep. 27, 2007

Related U.S. Application Data

(63) Continuation of application No. 10/113,587, filed on Feb. 28, 2002, now Pat. No. 7,051,319, which is a continuation of application No. 09/820,082, filed on Mar. 27, 2001, now abandoned.

(51) Int. Cl.
 *G06F 9/44* (2006.01)
(52) U.S. Cl. ........ 717/168; 717/116; 717/122; 717/169; 717/170
(58) Field of Classification Search .................. 717/168, 717/116
 See application file for complete search history.

(56) References Cited

U.S. PATENT DOCUMENTS

| | | | |
|---|---|---|---|
| 5,249,300 A | 9/1993 | Bachman et al. | |
| 5,339,438 A | 8/1994 | Conner et al. | |
| 5,386,568 A | 1/1995 | Wold et al. | |
| 5,493,680 A | 2/1996 | Danforth | |
| 5,651,108 A | 7/1997 | Cain et al. | |
| 5,715,450 A | 2/1998 | Ambrose et al. | |
| 5,732,263 A * | 3/1998 | Havens et al. | 1/1 |
| 5,751,909 A | 5/1998 | Gower | |
| 5,768,510 A | 6/1998 | Gish | |
| 5,787,275 A | 7/1998 | Li | |
| 5,802,514 A | 9/1998 | Huber | |
| 5,819,092 A | 10/1998 | Ferguson et al. | |

(Continued)

FOREIGN PATENT DOCUMENTS

EP    0 811 193    12/1997

(Continued)

OTHER PUBLICATIONS

Henninger et al., "An Organizational Learning Approach to Domain Analysis," ACM ICSE, pp. 95-104, 1995.

(Continued)

*Primary Examiner* — Thomas K Pham
(74) *Attorney, Agent, or Firm* — Campbell Stephenson LLP

(57) ABSTRACT

Techniques for identifying "relevant" objects for upgrading a repository of objects in a computer system. The relevant objects to be used for upgrading may include any combination of (1) "corresponding" objects in a prior and a new standard repository, (2) "ancestor" objects in the prior and new standard repositories, and (3) ancestor objects in a prior custom repository. A corresponding object typically has the same name as, and an ancestor object is referenced by, the object to be upgraded. In one scheme, objects in the prior custom repository are upgraded based on (1) their corresponding objects, if these exist, and (2) their ancestors in the prior and new standard repositories, otherwise. In another scheme, the objects are additionally upgraded based on their ancestors in the new standard repository. In yet another scheme, the objects are further upgraded based on their ancestors in the prior custom repository.

16 Claims, 9 Drawing Sheets

U.S. PATENT DOCUMENTS

| | | | |
|---|---|---|---|
| 5,832,274 A * | 11/1998 | Cutler et al. | 717/171 |
| 5,845,128 A * | 12/1998 | Noble et al. | 717/170 |
| 5,911,075 A | 6/1999 | Glaser et al. | |
| 5,970,252 A | 10/1999 | Buxton et al. | |
| 5,978,579 A | 11/1999 | Buxton et al. | |
| 6,002,867 A | 12/1999 | Jazdzewski | |
| 6,043,815 A | 3/2000 | Simonoff et al. | |
| 6,104,874 A | 8/2000 | Branson et al. | |
| 6,175,948 B1 | 1/2001 | Miller et al. | |
| 6,182,277 B1 | 1/2001 | DeGroot et al. | |
| 6,233,617 B1 | 5/2001 | Rothwein et al. | |
| 6,263,498 B1 | 7/2001 | Alcorn et al. | |
| 6,268,853 B1 | 7/2001 | Hoskins et al. | |
| 6,272,537 B1 | 8/2001 | Kekic et al. | |
| 6,286,017 B1 | 9/2001 | Egilsson | |
| 6,292,925 B1 | 9/2001 | Dellinger et al. | |
| 6,367,077 B1 * | 4/2002 | Brodersen et al. | 717/170 |
| 6,370,681 B1 | 4/2002 | Dellarocas et al. | |
| 6,378,003 B1 | 4/2002 | Danforth | |
| 6,415,027 B1 | 7/2002 | Malik | |
| 6,418,450 B2 | 7/2002 | Daudenarde | |
| 6,434,740 B1 | 8/2002 | Monday et al. | |
| 6,457,164 B1 | 9/2002 | Hwang et al. | |
| 6,526,423 B2 | 2/2003 | Zawadzki et al. | |
| 6,553,563 B2 * | 4/2003 | Ambrose et al. | 717/116 |
| 6,567,807 B1 | 5/2003 | Robles et al. | |
| 6,574,630 B1 | 6/2003 | Augustine et al. | |
| 6,574,635 B2 | 6/2003 | Stauber et al. | |
| 6,647,394 B1 | 11/2003 | Herzberg et al. | |
| 6,684,388 B1 | 1/2004 | Gupta et al. | |
| 6,693,647 B1 | 2/2004 | Bernard et al. | |
| 6,697,825 B1 | 2/2004 | Underwood et al. | |
| 6,754,885 B1 * | 6/2004 | Dardinski et al. | 717/113 |
| 7,010,523 B2 | 3/2006 | Greenfield et al. | |
| 7,051,319 B1 | 5/2006 | Thorson | |
| 7,089,530 B1 * | 8/2006 | Dardinski et al. | 717/105 |
| 7,117,449 B1 | 10/2006 | Levin et al. | |
| 7,203,938 B2 | 4/2007 | Ambrose et al. | |
| 7,316,000 B2 | 1/2008 | Poole et al. | |
| 2005/0216421 A1 | 9/2005 | Barry et al. | |
| 2007/0277153 A1 | 11/2007 | Ambrose et al. | |

FOREIGN PATENT DOCUMENTS

| | | |
|---|---|---|
| WO | WO 2000/033187 | 6/2000 |
| WO | WO 2004/003684 | 1/2004 |
| WO | WO 2004/061815 | 7/2004 |

OTHER PUBLICATIONS

Garlan et. al., "Architectural Mismatch or Why It's Hard to Build System Out of Existing Parts," ACM ICSE, pp. 179-185, 1995.

Benedicenti et al., "Reuse Libraries for Real Time Multimedia Over the Network," ACM SIGAPP, vol. 8, No. 1, Sep. 2000.

Henninger et al., "A Framework for Developing Experience Based Usability Guidelines,"ACM DIS, pp. 43-53, 1995.

Carnell, M., "Applet Designer," DBMS and Internet Systems, Jun. 1997.

TV Objects Corporation, "Applet Designer Enterprise Edition," Jun. 1997.

Taulli, T., "Visual Basic Meets Java," Internet Java and ActiveX Advisor Magazine, Aug. 1997.

Sugumaran et al., "Identifying Software Components from Process Requirements Using Domain Model and Object Libraries," ACM, pp. 65-81, Jan. 1999.

Bernstein, "Repositories and Object Oriented Databases," ACM, pp. 88-96, Mar. 1998.

Henninger, "Supporting The Construction and Evolution of Component Repositories," ACM, pp. 279-288, 1996.

Chen et al., "Exploring Performance Issues for a Clinical Database Organized Using an Entity-Attribute-Value Representation," Journal of American Medicine Information Association, vol. 7, No. 5, pp. 475-487, Mar. 2000.

* cited by examiner

METHOD, SYSTEM, AND PRODUCT FOR UPGRADING SOFTWARE OBJECTS USING INHERENCY

CROSS-REFERENCE TO RELATED APPLICATION

This application is a continuation of U.S. application Ser. No. 10/113,587 filed Feb. 28, 2002 now U.S. Pat. No. 7,051,319, entitled "Method, System, and Product for Upgrading Software Objects Using Inherency," which is a continuation of U.S. application Ser. No. 09/820,082, entitled "Method and Apparatus for Upgrading Software Objects Using Inherency," filed Mar. 27, 2001 now abandoned, which is incorporated herein by reference in its entirety for all purposes.

BACKGROUND OF THE INVENTION

The present invention relates generally to computer processing, and more particularly to techniques for upgrading software objects using inherency.

Many complex software applications have been created to assist business enterprises manage and operate their businesses. An important class of such software applications focuses in the area of customer relationship management (CRM). A CRM application allows an enterprise to maintain track of various entities such as contacts, products, activities, and so on, and to define the relationships between the entities with defined sets of rules (e.g., business opportunities). The CRM application typically provides a set of screens, menus, forms, and so on that allow a user to enter, modify, and view information related to these different entities. For example, different forms may be provided to present information for different entities, and each form typically includes a number of fields for various attributes associated with the entity being displayed.

A software application may include a repository of objects at various architecture layers. The objects in the repository may be referred to as "meta objects" or "repository objects" or simply "objects". For example, the forms may represent a class of objects at a user interface layer. Other objects may also be provided at an object layer and a data layer. These objects are used to support the functions and features for the software application.

Different business enterprises typically have different requirements and preferences. This may necessitate the need to modify some of the objects (e.g., forms and fields) provided with an out-of-the-box (OOTB) software application. A software vendor may recognize this need and provide the necessary tools (e.g., as part of the software application) to allow an enterprise to customize the objects (e.g., forms and fields) in accordance with its needs and preferences.

Complex software applications may also be revised or upgraded over time to provide enhanced features and functionality, and to possibly remedy any prior deficiencies. A revised application may include upgraded versions of certain objects. In the upgrade process, it is often preferable to retain prior customizations performed by the enterprise while at the same time upgrade the objects to obtain the benefits of the upgrade features and functionality.

The upgrade process can be quite complicated since a complex software application may include a large number of objects (e.g., possibly thousands or even millions). Moreover, customization may have been performed by an enterprise on any or all objects shipped with an OOTB software application. Thus, techniques that facilitate the upgrade of these objects while retaining prior customizations are highly desirable.

SUMMARY OF THE INVENTION

The invention provides various techniques to allow replicated and newly created objects to be upgraded in a manner to retain prior customizations while incorporating any upgrade (e.g., new features, child objects) included in their "relevant" objects, which are objects designated to be used for the upgrade of the replicated and newly created objects. In one aspect, an object is provided with an Upgrade Ancestor field (i.e., a property) that may be used to indicate an "ancestor" from which the object originates. For a replicated object, this field may store the identity of an ancestor object from which the copy was made. If this field has a non-null value and the replicated object does not have a corresponding object in a prior standard repository or a new standard repository (i.e., the object is a newly created object in a prior custom repository), then the replicated object may be upgraded in similar manner as the object referenced in the Upgrade Ancestor field. In this case, the relevant object comprises the ancestor object. However, the name of the replicated object is retained to distinguish the object from the ancestor object.

In another aspect, various upgrade inherency schemes are provided for the repository upgrade of replicated objects. In one scheme, the objects in the prior custom repository may be upgraded based on "corresponding" objects in the prior and new standard repositories (e.g., with the same name), if these corresponding objects exist. And if the corresponding objects do not exist, then the objects in the prior custom repository may be upgraded based on ancestor objects in the prior and new standard repositories. In another scheme, the objects may additionally be upgraded based on their ancestors in the new standard repository. And in yet another scheme, the objects may further additionally be upgraded based on their ancestors the prior custom repository. Other schemes may also be used wherein the relevant objects to be used for the upgrade may include any combination of (1) corresponding objects in the in the prior and new standard repositories, (2) ancestor objects in the prior and new standard repositories, and (3) ancestor objects in the prior custom repository.

In one type of upgrade inherency scheme, one level of upgrade inherency is supported, and each replicated object in a prior custom repository may be upgraded based on a (top-level) object from which the replicated object was directly or indirectly copied. In another type of scheme, multiple levels of upgrade inherency are supported, and each replicated object in the prior custom repository may be upgraded based on a chain of ancestors (e.g., up to a top-level object). These and other aspects and embodiments are described in further detail below.

A specific embodiment of the invention provides a method for upgrading a repository of objects in a computer system. In accordance with the method, objects in a first repository (e.g., a prior custom repository) are identified, and objects in a second repository (e.g., a new standard repository) and typically a third repository (e.g., a prior standard repository) corresponding to the objects in the first repository are determined. The corresponding objects in the prior and new standard repositories typically have the same names as the objects in the prior custom repository. Attributes of the objects in the prior custom repository are then upgraded with attributes of the corresponding objects in the new and (typically) prior standard repositories. Ancestors of the objects in the prior custom repository are determined (e.g., by checking an Upgrade Ancestor field), and objects in the prior and new standard repositories that are ancestors of the objects in the prior custom repository are identified. Depending on the particular upgrade inherency scheme being implemented, the attributes of the objects in the prior custom repository are selectively upgraded with attributes of their ancestor objects in the new and prior standard repositories. In another scheme, objects in the prior custom repository may further be upgraded based on their ancestor objects in the prior custom repository.

The invention further provides other methods, computer program products, and systems capable of implementing various aspects, embodiments, and features of the invention, as described in further detail below.

The foregoing, together with other aspects of this invention, will become more apparent when referring to the following specification, claims, and accompanying drawings.

DESCRIPTION OF THE SPECIFIC EMBODIMENTS

Figure 1:
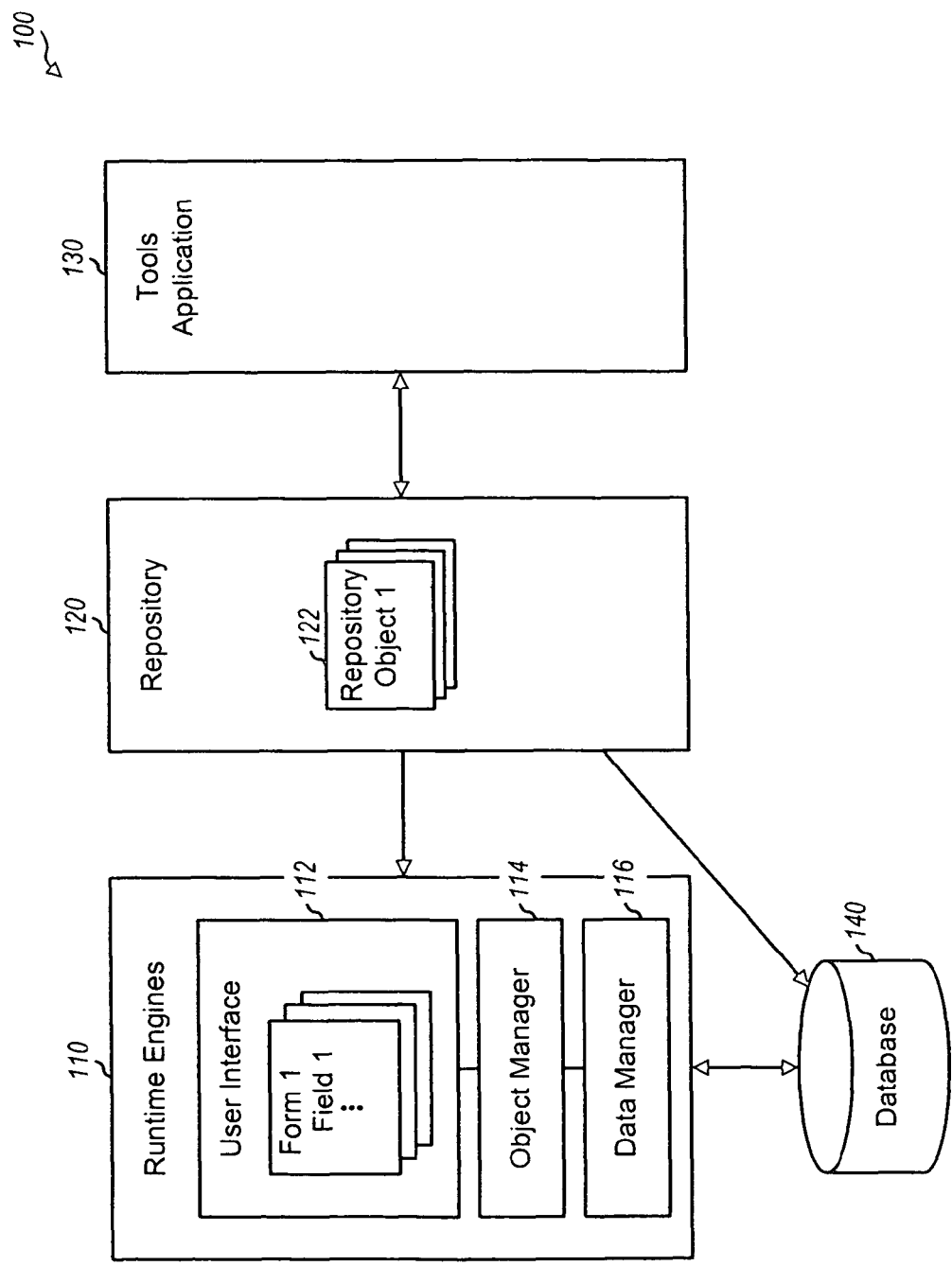
FIG. 1 is a simplified diagram of an embodiment of a system that may be capable of implementing various aspects of the invention.

FIG. 1 is a simplified diagram of an embodiment of a system 100, which may be capable of implementing various aspects of the invention. System 100 comprises runtime engines 110, a repository 120, a tools application 130, and a database 140.

Runtime engines 110 include various modules that collectively provide the functionality supported by system 100. In an embodiment, runtime engines 110 include a user interface 112, an object manager 114, and a data manager 116. Different and/or additional modules may also be included in runtime engines 110. User interface 112 provides interface with users via a set of screens, which may be used to display various menus, forms, and other representations. The menus, forms, and so on are typically generated by corresponding applets, which are high-level software objects. Object manager 114 interacts with user interface 112 and provides the necessary data, e.g., for the forms being rendered. Object manager 114 further exchanges data between user interface 112 and data manager 116, as appropriate. Data manager 116 manages database 140 and typically performs this function by invoking SQL objects.

Repository 120 includes records that define how each of a number of repository objects 122 within the repository should look and behave. Repository objects 122 may be objects at various architecture layers (e.g., the user interface, object, and data layers) and are provided to support the functions and features for a software application. For example, a form may represent a class of objects at the user interface layer and may be provided for displaying information to users. Each repository object 122 (or simply "object") may be defined by a set of attributes.

A hierarchical structure may also be used for the objects such that an object may be a parent object that includes one or more child objects. Each child object may further be a parent object that includes one or more child objects. This hierarchical structure can continue in this manner, and any number of parent-child layers may be supported.

Repository 120 may include "original" objects that are provided with an out-of-the box software application and "customized" objects that are non-original objects (e.g., replicated and newly created objects).

Tools application 130 includes a set of tools that allow the users to replicate, create, modify, and customize the objects in repository 120 to suit the specific requirements and preferences of the business enterprise for which system 100 is deployed. Database 140 stores the data used by runtime engines 110, and typically further stores the objects in repository 120.

The upgrade inherency techniques described herein may be applied to objects at various architecture layers. However, for clarity, many aspects and features of the invention are described for a specific type of object-forms, which are used at the user interface layer.

Figure 2:
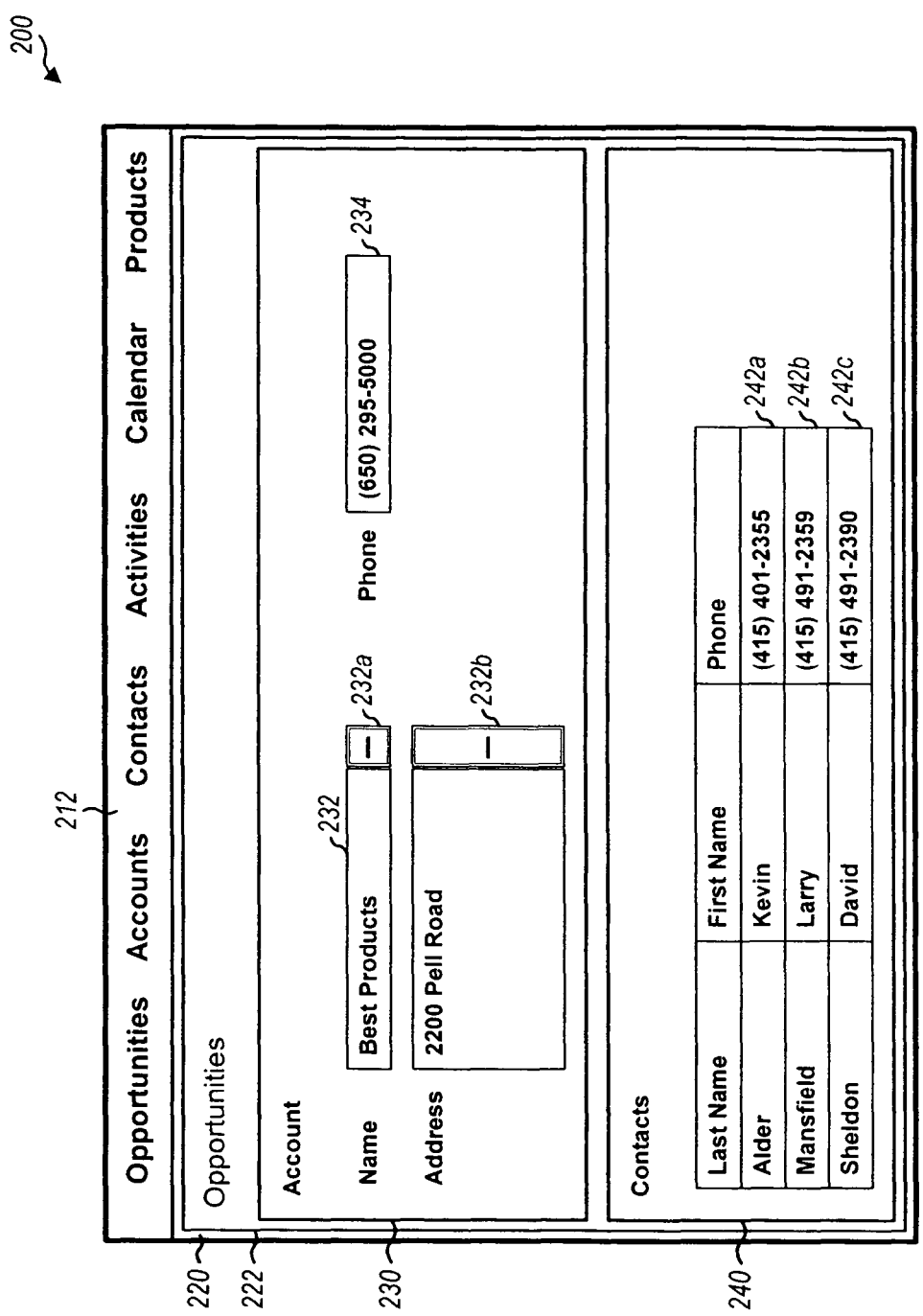
FIG. 2 illustrates a user interface screen that may be used to display information for a software application.

FIG. 2 illustrates a user interface screen 200 that may be used to display information for application 100. Screen 200 may be used to display available and pertinent information for a particular entity (e.g., opportunities, contacts, activities, and so on), and to allow a user to add and modify the contents and possibly the forms and fields displayed in the screen. Screen 200 includes main pull-down menus 212 and a main display area 220. Main pull-down menus 212 may be used to invoke various individual functionality and features provided by the software application.

Main display area 220 may be used to present information for a selected entity, which in this example is "Opportunities". In the specific embodiment shown in FIG. 2, main display area 220 includes a frame 230 used to display account information related to the Opportunities entity and a frame 240 used to display contact information. Frames 230 and 240 may be viewed as components of a form 222, which may be displayed when the Opportunities entity is invoked. Different, fewer, or greater number of frames may also be selected for display in main display area 220.

As used herein, a frame is a display window used to present a collection of data. A frame may be defined to have any size and shape, and may present information in accordance with a particular layout and design. For example, frame 230 presents a single record of data using a number of fields 232 and 234, and frame 240 presents a number of records of data as a series of rows 242.

A software application may provide a set of pre-packaged objects (e.g., forms) that are ready for use out-of-the-box. Moreover, the software application may include capabilities (i.e., tools) that allow a user to modify the objects based on the specific requirements and preferences of the enterprise for which the application is used. For example, in form 222 account frame 230 may originally include fields 232a and 232b for the account name and address, and the user may thereafter add a new field 234 for phone number. The software application may further allow one or more forms to be replicated from an original form provided with the application.

Each of the replicated forms may thereafter be modified to suit any requirements and preferences.

The forms may be implemented with certain types of objects provided with the software application. In general, the software application typically includes various types of objects. These objects include top-level objects and lower-level objects. A top-level object is one that does not reference another object as its parent. The replicate and modify operations may be allowed for objects of various (or possibly all) types. For example, a top-level object typically includes one or more child objects, and the child objects may also be replicated and modified.

A "standard" repository may be provided (e.g., in a file) with a software application. This repository can include the original out-of-the box objects provided with the software application. During installation of the software application, a "custom" repository may be created, which initially can include the original objects transferred from the standard repository. The transferred objects in the custom repository are typically given the same names as their corresponding objects in the standard repository. Thereafter, during normal use of the software application, objects in the custom repository may be modified or replicated to create new objects. New objects may also be created from other objects stored in the database or using the tools provided with the software application. If the replicated and newly created objects are stored in the same custom repository, they are typically given names that are different from those of the original objects to uniquely identify and distinguish the objects.

The software application may be revised or upgraded over time to provide enhanced features and functionality, and to possibly remedy any prior deficiencies. The newer software version may include upgraded objects having new features, functionality, and/or newly added child objects. The upgraded objects may be designed to replace prior version of the corresponding objects.

An Application Upgrader may be tasked with performing the upgrade for the objects in the custom repository, and may use the name of an object as a primary key for associating comparable objects across different versions of the application. The new standard repository associated with the new software version includes the upgraded objects, which are often given the same names as the corresponding objects in the prior standard repository. The objects in the prior custom repository may then be upgraded by (1) matching each object in the prior custom repository with its corresponding objects (e.g., with the same name) in the new and prior standard repositories, and (2) merging the three objects.

However, if the replicated or newly created objects in the prior custom repository are given different names than those of the original objects (e.g., to differentiate between the original and replicated/created objects in the prior custom repository), then the Application Upgrader would not be able to identify the object in the new standard repository corresponding to the replicated/created object in the custom repository using the name matching technique. In this case, the replicated/created objects in the prior custom repository would not be automatically upgraded with the new features and child objects in the corresponding objects.

Conventionally, newly created, replicated, and customized objects do not get upgraded. However, these objects are typically intended to function in similar manner to their corresponding objects in the standard repository. Without a proper upgrade mechanism, the upgrade cannot be performed to provide these objects with the new features and functionality included in the upgraded objects in the new standard repository.

The invention provides various techniques to allow replicated and newly created objects to be upgraded and maintained in a manner to retain prior customizations while incorporating any upgrade (e.g., new features, child objects) included in the relevant upgraded objects. In one aspect, an object is provided with an Upgrade Ancestor field (i.e., a property) that may be used to indicate an "ancestor" from which the object originates. For a replicated object, this field may store the identity of an ancestor object from which the replicated object was copied. If this field has a non-null value and the replicated object does not have a corresponding object in a prior standard repository or a new standard repository (i.e., the object is a newly created object in a prior custom repository), then the replicated object may be upgraded in similar manner as the object referenced in the Upgrade Ancestor field. However, the name of the replicated object is retained to distinguish the object from the ancestor object.

In another aspect, various upgrade inherency schemes are provided for the repository upgrade. The objects in the prior custom repository may be upgraded based on corresponding objects in the prior and new standard repositories, if these corresponding objects exist. Additionally or possibly alternatively, the objects may further be upgraded based on their ancestors in the new standard repository or the prior custom repository, or both. These and other aspects and embodiments are described in further detail below.

In one type of upgrade inherency schemes, one level of upgrade inherency is supported, and each replicated object in the prior custom repository may be upgraded based on a (top-level) object from which the replicated object was directly or indirectly copied. In another type of schemes, multiple levels of upgrade inherency are supported, and each replicated object in the prior custom repository may be upgraded based on a chain of ancestors (e.g., up to the top-level object).

Figure 3A:
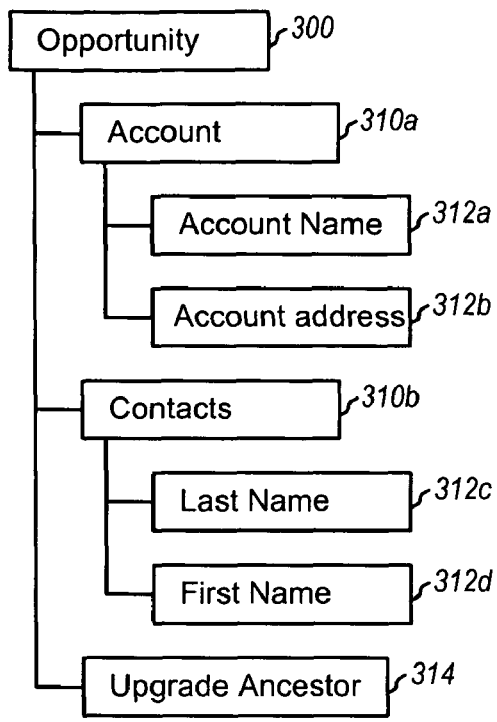
FIG. 3A is a diagram illustrating a hierarchical structure for a top-level object.

FIG. 3A is a diagram illustrating a hierarchical structure for a top-level object 300. Object 300 may represent the Opportunities form 222 shown in FIG. 2, and includes a number of child objects 310a and 310b. Each child object 310 of top-level object 300 may be used to render a frame for a respective entity (e.g., account, contacts). Each object 310 may further include one or more child objects 312, each of which may represent a text box, a table entry, or some other representation for a property of the entity associated with the object. For example, account object 310a includes child objects 312a and 312b for the account name and account address fields, respectively. The hierarchical structure may continue in this manner, and any number of parent-child layers may be supported.

In accordance with an aspect of the invention and as shown in FIG. 3A, object 300 includes an Upgrade Ancestor field 314. For an object that has been replicated, this field 314 may include the identity of an ancestor object from which the replicated object was copied. The replicated object is thus considered a "descendant" object of the ancestor object. The Upgrade Ancestor field may be set to null for an non-replicated object (e.g., an original object transferred from the standard repository), and may also be set to null for a replicated object in which future upgrade is not desired.

Figure 3C:
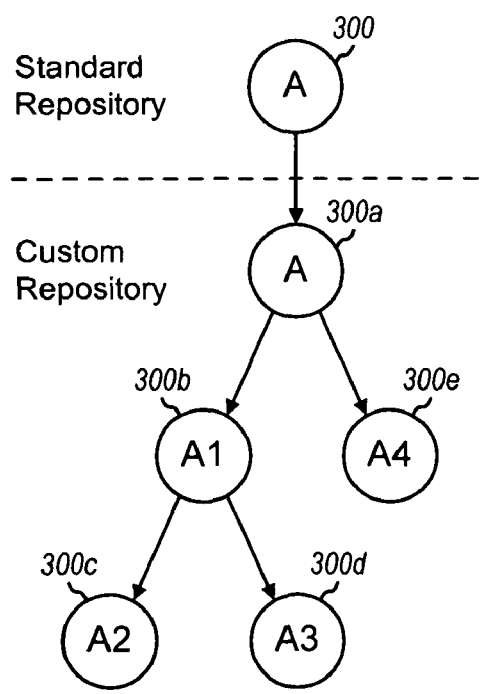
FIG. 3C is a diagram that illustrates a hierarchical structure in which objects may be created.
Figure 3B:
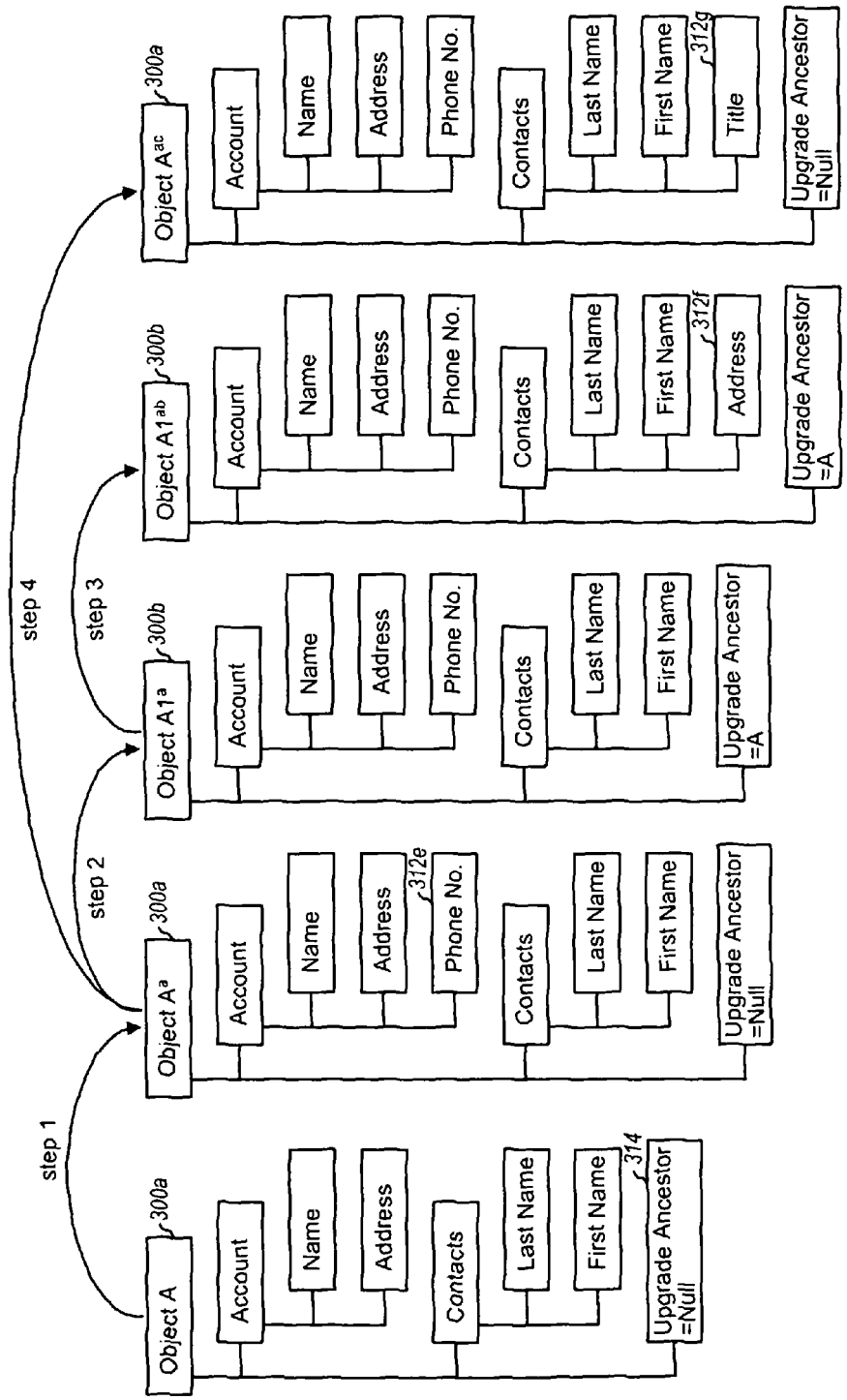
FIG. 3B is a diagram that illustrates several methods for modifying and replicating objects.

FIG. 3B is a diagram that illustrates several methods for modifying and replicating objects. An original object in the standard repository may be transferred as object 300a (denoted as "A") in the custom repository (e.g., during the software installation process or a prior upgrade of the software application). Since object 300a has the same name as the original object in the standard repository, Upgrade Ancestor field 314 for object 300a may be set to null. Thereafter, object 300a may be modified to customize the object (denoted as "A$^a$"). This modification may be the addition of a child object 312e used to render the phone number list box 234 in account frame 230 in FIG. 2.

Object 300a may thereafter be copied to create an object 300b (denoted as "A1$^a$") in the custom repository. Object 300b includes any customization already made to object 300a at the time of the copy (e.g., child object 312e for phone number, denoted as "$^a$"). Upgrade Ancestor field 314 for object 300b may identify object 300a as the ancestor object from which it originated. Object 300b may thereafter be modified to further customize the object (denoted as "A1$^{ab}$"). For example, a child object 312f may be added to render an address field for the contacts in contacts frame 240.

Additional customization may be performed on any object at any time. For example, a child object 312g used to render a title field for the contacts in contacts frame 240 may be added in object 300a (now denoted as "A$^{ac}$"). This modification is not reflected in object 300b because objects 300a and 300b are considered to be two distinct objects.

FIG. 3C is a diagram that illustrates a hierarchical structure in which objects may be created. Object 300 is an out-of-the-box object associated with the standard repository. Object 300 is originally transferred (during installation or a previous upgrade) to create object 300a in the custom repository. Object 300a may thereafter be replicated to create object 300b (e.g., as described above in FIG. 3B), which then includes the name of object 300a in its Upgrade Ancestor field. Object 300b may further be replicated to create objects 300c and 300d. And object 300a may further be replicated to create object 300e. As indicated by FIG. 3C, any object may be replicated to create new objects, and any object in the custom repository may be modified.

The upgrade inherency described herein may be implemented based on various types of schemes. In one type of scheme, one level of inherency is supported, and each replicated object includes in its Upgrade Ancestor field either (1) the value in the Upgrade Ancestor field of the ancestor object from which it was copied, if one exists, or (2) the identity of the ancestor object from which it was copied. For this type of scheme, object 300a would include a null value in its Upgrade Ancestor field since it is the first such object in the custom repository. Objects 300 and 300a may be viewed as corresponding ancestor objects in the standard and custom repositories, respectively. Object 300b is replicated from object 300a and would include in its Upgrade Ancestor field the name of object 300a, since the Upgrade Ancestor field for object 300a is set to null. Object 300c would include in its Upgrade Ancestor field the name of object 300a, which appears in the Upgrade Ancestor field of object 300b from which object 300c was copied. In this manner, objects 300b, 300c, and 300d reference one object 300a from which they were all directly or indirectly copied.

In another type of scheme, multiple levels of inherency are supported, and each replicated object includes in its Upgrade Ancestor field the identity of the ancestor object from which it was copied. In this type of scheme, object 300b would include in its Upgrade Ancestor field the name of object 300a from which it was copied, and objects 300c and 300d would each include in its Upgrade Ancestor field the name of object 300b from which it was copied. The multi-level upgrade inherency scheme may be used (if at all) when all levels are newly created or replicated objects, and these objects may be selectively upgraded based on their ancestors within the same repository.

Each upgrade inherency scheme identifies the particular relevant object(s) to be used for upgrading each object in the custom repository (which may be a null value). Different upgrade inherency schemes identify different relevant objects, which then result in different upgrade outcomes. This is described in further detail below.

Figure 4:
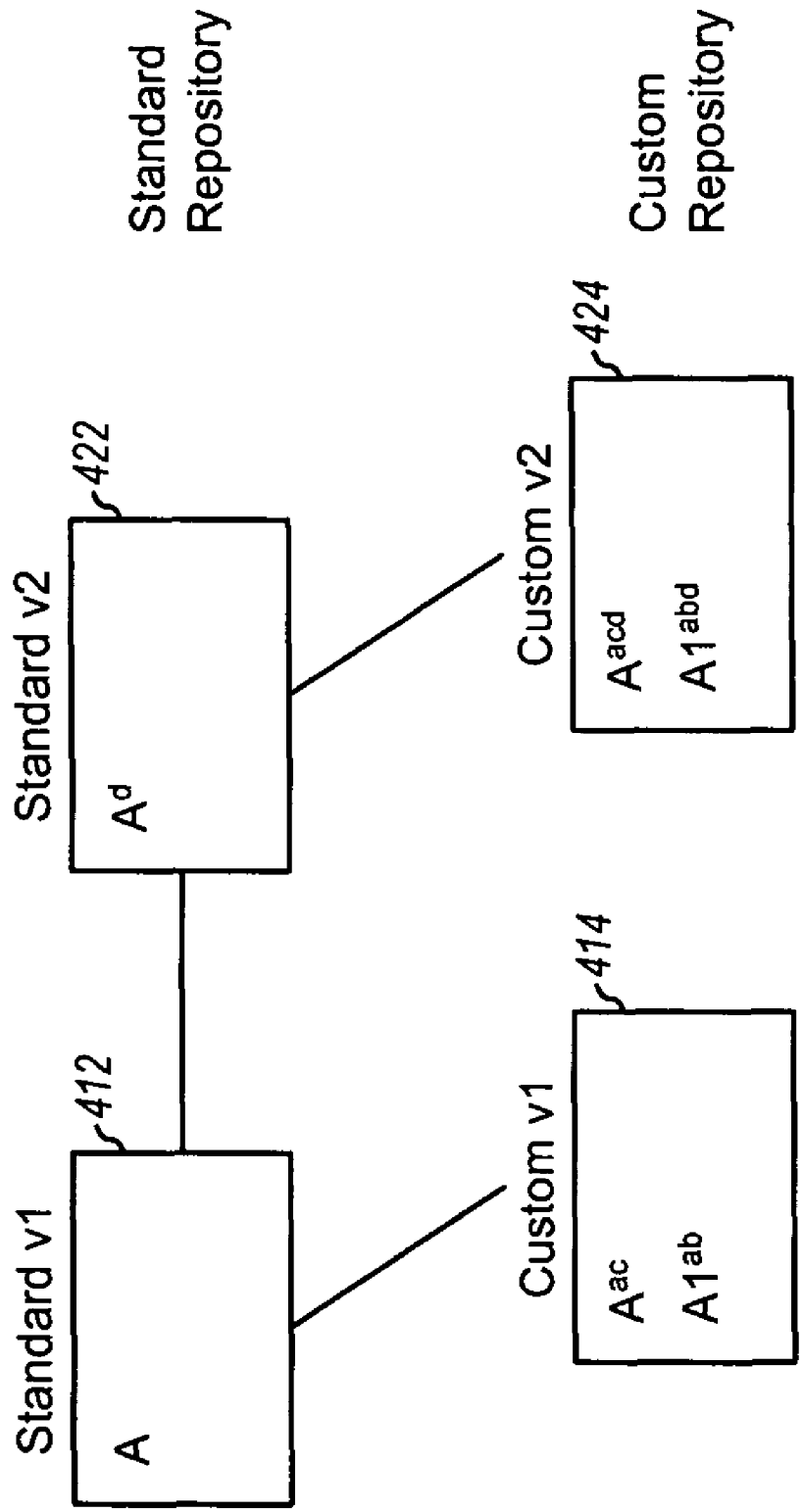
FIG. 4 shows a pictorial view of the standard and custom repositories during a repository upgrade.

FIG. 4 shows a pictorial view of the standard and custom repositories during a repository upgrade. During the upgrade, a standard repository 412 and a custom repository 414 associated with the current (e.g., first) version v1 of the software application are made available. Standard repository 412 includes original objects provided with software version v1 (i.e., out-of-the-box objects), and custom repository 414 includes original, modified, and replicated objects (i.e., all objects available for use with the software application). For the simple example shown, standard repository 412 includes object A and custom repository 414 includes objects A$^{ac}$ and A1$^{ab}$, which may have been created as described above in FIG. 3B. In this example, object A$^{ac}$ in custom repository 414 corresponds to object A in standard repository 412 (e.g., they have the same name, but object A$^{ac}$ includes customizations made on object A), and object A1$^{ab}$ in custom repository 414 references object A as its ancestor (i.e., the object from which it was created) in the Upgrade Ancestor field. Object A1$^{ab}$ does not have a corresponding object in standard repository 412.

Software version v1 is subsequently upgraded with a new software version v2 that includes a standard repository 422. In this example, standard repository 422 includes an object A$^d$ having an upgrade feature that is not present in the corresponding object A in standard repository 412. To create a custom repository 424 for software version v2, the object A$^d$ in standard repository 422 is first transferred to create the object A$^d$ in custom repository v2. The object A$^{ac}$ in custom repository 414 is then identified and its corresponding object is determined as object A in standard repository 412. Since object A$^{ac}$ corresponds to object A and since object A corresponds to object A$^d$, object A$^{ac}$ is upgraded with objects A and A$^d$ to create the corresponding object A$^{acd}$ in custom repository 424. Similarly, object A1$^{ab}$ in repository 414 is identified and its upgrade ancestor is determined as object A. Since object A1$^{ab}$ claims object A as its upgrade ancestor and since object A corresponds to object A$^d$, object A1$^{ab}$ is upgraded with objects A and A$^d$ to create the corresponding object A1$^{abd}$ in custom repository 424.

The upgrade of an object in the prior custom repository (i.e., a "target" object) with relevant objects in the prior and new standard repositories (and possibly other relevant objects in the prior custom repository) can be achieved based on a set of rules. These rules may be defined via an Option Menu provided by a software application. The upgrade may be achieved by merging the target object with the relevant objects. This merge may be performed on an attribute-by-attribute basis, and specific rules may be defined to resolve instances in which values for a particular attribute are different in three (or possibly more) objects being merged.

In one upgrade inherency scheme, the customizations in the ancestor in the prior custom repository 414 are not propagated to the upgraded descendant. For the example shown in FIG. 4, the additional customization to object A$^{ac}$ after the descendant A1$^{ab}$ was created (denoted as "$^c$") is not included in the upgrade of the descendant object A1$^{abd}$ in the new custom repository 424. Only modifications to object A$^{ac}$ prior to the creation of descendant A1$^{ab}$ (denoted as "$^a$") are retained in the upgraded descendant object A1$^{abd}$. Descendant A1$^{abd}$ is also upgraded with the modification (denoted as "$^d$") to the ancestor A$^d$ in the new standard repository 422.

In another upgrade inherency scheme, the customizations made to the ancestor in the prior custom repository 414 in addition to modifications to the ancestor in new standard repository 422 may be propagated to the upgraded descendant in the new custom repository 424, as described in further detail below.

Table 1 describes a specific embodiment of the upgrade inherency logic that may be used to create a new custom repository for a software upgrade, in accordance with one upgrade inherency scheme of the invention. The specific embodiment shown in Table 1 supports a single level of upgrade inherency and the replicated objects (descendants) do not have corresponding objects in the prior standard and new standard repositories. Table 1 lists four repositories corresponding to repositories 412, 414, 422, and 424 shown in FIG. 4, which are made available during the upgrade process.

Table 1 further shows the upgrade inherency logic for four possible events for the upgrade (one row for each possible event). For this example, the ancestor in the prior standard repository v1 was initially transferred to create the ancestor for the prior custom repository v1, which may or may not thereafter be modified. For this example, the ancestor in the prior custom repository v1 was replicated to create a descendant object A1. For this example, a single level of upgrade inheritance is supported, and the descendant in the prior custom repository v1 references the object A in the prior standard repository v1 as its upgrade ancestor (i.e., the name of the ancestor A is included in the Upgrade Ancestor field of the descendant A1 in the prior custom repository v1).

For the new custom repository v2, the ancestor $A^a$ in the prior custom repository v1 is upgraded with corresponding ancestors A and A in the prior and new standard repositories v1 and v2, respectively. And since there have been no modifications in the ancestor in the new standard repository v2, the ancestor $A^a$ in the prior custom repository v1 is provided in the new custom repository v2. In this upgrade inherency scheme, the descendant A1 in the custom repository v1 is upgraded with the ancestors A and A in the prior and new standard repositories v1 and v2, since it has no corresponding objects in the standard repositories but references ancestor A in its Upgrade Activity field. And again, since there have been no modifications to ancestor A, the same descendant A1 is provided in the new custom repository v2. In this scheme, modifications to the ancestor $A^a$ in the prior custom repository are not propagated to the descendant A1.

In the third row, the ancestor A in the prior custom repository v1 has not been modified, and the new standard repository v2 includes an upgraded object $A^b$ for the ancestor A in the prior standard repository v1. For the new custom repository v2, the ancestor A in the custom repository v1 is upgraded with corresponding ancestors A and $A^b$ in the prior and new standard repositories v1 and v2, respectively. And since there have been a modification to the ancestor $A^b$, the ancestor A in the prior custom repository v1 is upgraded with the feature "$^b$" and the ancestor $A^b$ is provided in the new custom repository v2. In this upgrade inherency scheme, the descendant A1 in the prior custom repository v1 is upgraded with the ancestors A and $A^b$ in the prior and new standard

TABLE 1

| Prior Standard v1 | | Prior Custom v1 | | New Standard v2 | | New Custom v2 | |
| --- | --- | --- | --- | --- | --- | --- | --- |
| Ancestor | Descendt | Ancestor | Descendt | Ancestor | Descendt | Ancestor | Descendt |
| A | | A | A1 | A | | A | A1 |
| A | | $A^a$ | A1 | A | | $A^a$ | A1 |
| A | | A | A1 | $A^b$ | | $A^b$ | $A1^b$ |
| A | | $A^a$ | A1 | $A^b$ | | $A^{ab}$ | $A1^b$ |

In the first row of Table 1, the ancestor A in the prior custom repository v1 has not been modified and the new standard repository v2 does not include an upgrade for the ancestor A. For the custom repository v2, the ancestor A in the prior custom repository v1 is upgraded with corresponding ancestors A and A in the prior and new standard repositories v1 and v2, respectively. And since there have been no modifications to the ancestor in the new standard repository, the ancestor A in the prior custom repository v1 is provided in the new custom repository v2. In this upgrade inherency scheme, the descendant A1 in the prior custom repository v1 is upgraded with the ancestors A and A in the prior and new standard repositories v1 and v2, respectively. Descendant A1 has no corresponding objects in the prior and new standard repositories. However, descendant A1 references ancestor A in its Upgrade Ancestor field. This upgrade inherency scheme allows descendant A1 to be upgraded when and even though it has no corresponding objects in the prior or new standard repository. Since there have been no modifications to the ancestor of A1, the upgrade of descendant A1 in custom repository v1 with ancestors A and A in the prior and new standard repositories v1 and v2 results in descendant A1 being provided in the new custom repository v2.

In the second row, the ancestor A in the prior custom repository v1 has been modified to $A^a$, and the new standard repository v2 does not include an upgrade for the ancestor A.

repositories v1 and v2, again since it has no corresponding objects in the standard repositories, to provide the descendant $A1^b$ having the new feature "$^b$" in the ancestor $A^b$ in the new custom repository v2.

And in the fourth row, the ancestor A in the prior custom repository v1 has been modified to $A^a$, and the new standard repository v2 includes an upgraded object $A^b$ for the ancestor A. For the new custom repository v2, the ancestor $A^a$ in the prior custom repository v1 is upgraded with corresponding ancestors A and $A^b$ in the prior and new standard repositories v1 and v2, respectively. And since there have been modifications to the ancestors in the prior custom repository v1 and the new standard repository v2, there are now three different versions of the ancestor—namely A, $A^a$, and $A^b$. In an embodiment, the upgrade of ancestor $A^a$ in the prior custom repository v1 with ancestors A and $A^b$ in the prior and new standard repositories results in the ancestor $A^{ab}$ being formed and provided to the new custom repository v2. In this upgrade inherency scheme, the descendant A1 in the prior custom repository v1 is upgraded with the ancestor A and $A^b$ in the prior and new standard repositories v1 and v2, respectively, to provide the descendant $A1^b$ in the new custom repository v2.

As shown by the above, this upgrade inherency scheme allows a descendant in the prior custom repository having no corresponding objects in the prior and new standard repositories to be upgraded with the new features in the relevant (ancestor) objects in these standard repositories. In this manner, the descendant can be upgraded with new features and functionality.

Software applications can be created to assist business enterprises with various aspects of their business, such as sales, services (customer support), marketing, field services, and so on. Software applications can also be created for various types of enterprises such as financial services, health care/pharmaceuticals, communication, and others. For ease of implementation and upgrade, these various business aspects may be supported with different "base" modules, each of which may support a respective aspect of a business. Each base module may include a large number of objects. The software application for each type of enterprise may utilize and integrate all or a subset of the base modules. For example, a software application for financial services may include the modules for sales, services, and marketing. The objects in the integrated base modules may be customized within the software application to suit the specific requirements of the enterprise type.

Figure 5:
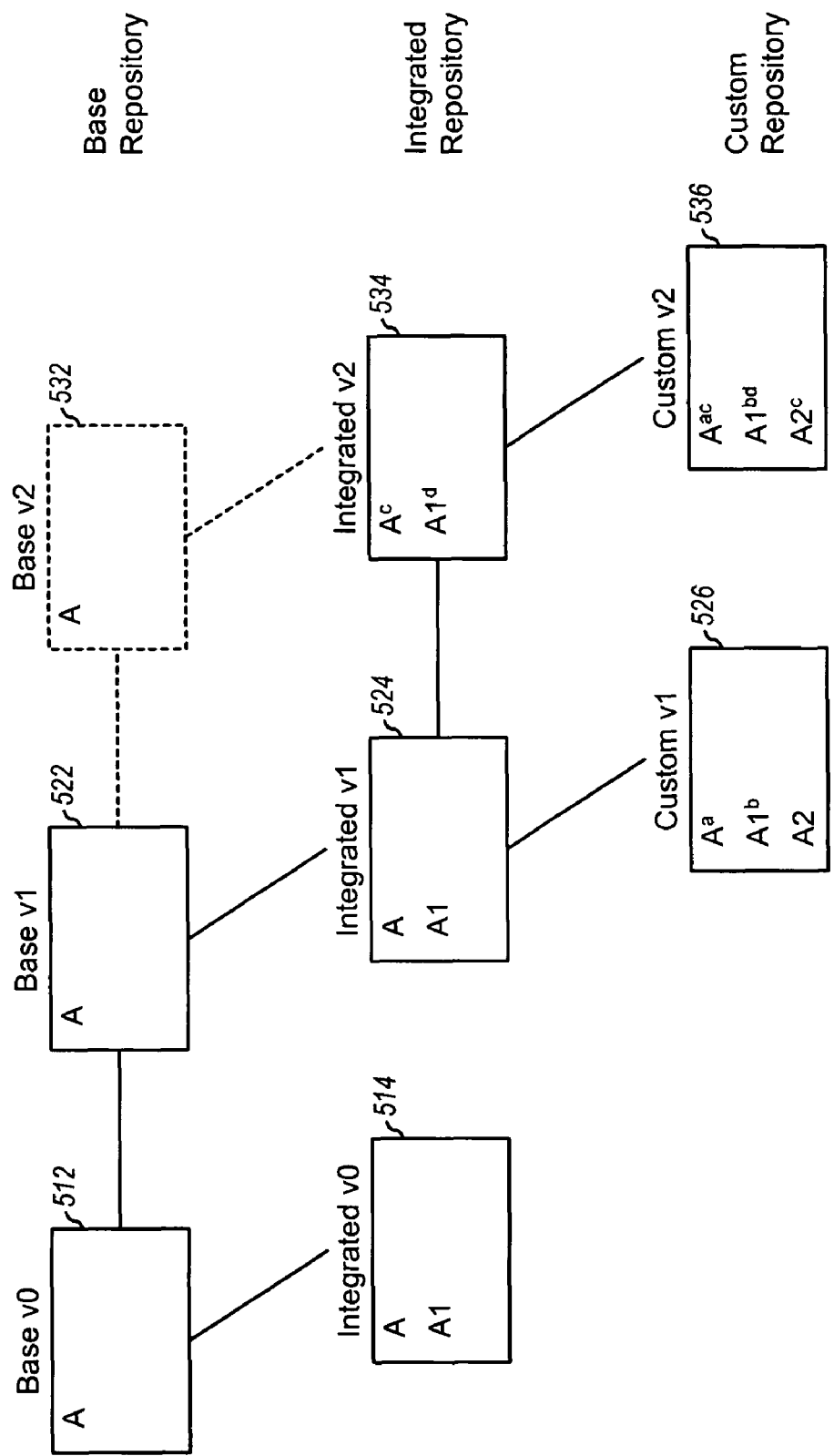
FIG. 5 shows a pictorial view of the base, integrated, and custom repositories during a repository upgrade.

FIG. 5 shows a pictorial view of the base, integrated, and custom repositories during a repository upgrade. Version v0 of the base software includes a base repository 512 having a number of objects (only one object A is shown for simplicity). The objects in base repository 512 are used to create version v0 of the integrated software (e.g., for the financial services industry), which includes an integrated repository 514. In this example, integrated repository 514 includes object A from the base repository 512 and an object A1 created from object A. Object A1 is a descendant that references object A as its ancestor. The base software and integrated software may be viewed as "horizontal" and "vertical" software, respectively.

Base software version v0 is subsequently upgraded with a new software version v1 that includes a standard repository 522. Objects in standard repository 522 may have been modified, in which case integrated standard repository 522 for software version v0 may also be upgraded to standard repository 524 for software version v1. This can be achieved by performing an upgrade similar to that shown in FIG. 4. For simplicity, object A have not been modified in the base software version 1, and standard repository 524 for integrated software version v1 includes the same objects A and A1 from standard repository 514 in the previous version v0.

Integrated software version v1 is then shipped to a business enterprise, which then creates a custom repository 526 (e.g., during the installation process). Subsequently, objects A and A1 in custom repository 526 may be modified to objects $A^a$ and $A1^b$, respectively, and object A2 may be created from object A (e.g., prior to object A being modified to object $A^a$).

Integrated software version v1 may be subsequently upgraded to a new software version v2 that includes a standard repository 534. Objects in standard repository 534 may have been upgraded (e.g., object A have been upgraded to object $A^c$). As another possible scenario, base software version v1 may have been upgraded to a new version v2 and includes an upgraded object $A^c$ in its standard repository 532 (not shown in FIG. 5), which when merged with standard repository 524 for integrated software version v1 creates object $A^c$ in standard repository 534 for integrated software version v2.

At the business enterprise, the integrated software version v1 may be upgraded with the new integrated software version v2. To create a custom repository 536 for the integrated software version v2, the objects in standard repository 534 are first transferred to create the objects in custom repository 536. The object $A^a$ in custom repository 526 is then identified, and its correspondence is determined as object A in standard repository 524. Since object $A^a$ in repository 526 corresponds to object A in repository 524 and object A corresponds to object $A^c$ in repository 534, object $A^a$ is upgraded with objects A and $A^c$ in standard repositories 524 and 534 to create object $A^{ac}$ in custom repository 536.

Object $A1^b$ in custom repository 526 is next identified and upgraded. In one upgrade inherency scheme, if a descendant in the prior custom repository has a corresponding descendant in the new standard repository, the descendant is upgraded with its correspondence and not its ancestor. For the example shown in FIG. 5, since object $A1^b$ in custom repository 526 has a corresponding object A1 in standard repository 524 and since object A1 corresponds to object $A1^d$ in standard repository 534, object $A1^b$ is upgraded with objects A1 and $A1^d$ in standard repositories 524 and 534 to create object $A1^{bd}$ in custom repository 536.

Object A2 in repository 526 is next identified and upgraded. Since object A2 does not have a correspondence in custom repository 524, it is upgraded with its ancestor A. And since object A in standard repository 524 corresponds to object $A^c$ in standard repository 534, the upgrade of object A2 with objects A and $A^c$ in standard repositories 524 and 534 creates object $A2^c$ in custom repository 536.

Table 2 describes a specific embodiment of the upgrade inherency logic that may be used to generate a new custom repository for an upgrade in which the standard repositories includes descendants, in accordance with another upgrade inherency scheme of the invention. In one possible scenario, objects in the base repository may be replicated to create descendants in the integrated repository. The integrated repository may then be shipped to customers as the standard repository. Table 2 lists four repositories corresponding to repositories 524, 526, 534, and 536 shown in FIG. 5.

Table 2 further shows the upgrade inherency logic for ten possible events for the upgrade (one row for each possible event). For the specific scheme shown in Table 2, descendants do not get upgrades from ancestors if corresponding descendants exist in the prior and new standard repositories. For this example, the ancestor and descendant in the new standard repository 534 are initially transferred to create the ancestor and descendant for the new custom repository 536. The ancestor and descendant in the prior custom repository 526 are then upgraded with the corresponding ancestors and descendants in the prior and new standard repositories 524 and 534 (or the prior standard repository 524 and the new custom repository 536, which includes the ancestor and descendant transferred from the new standard repository 534).

TABLE 2

| Prior Standard v1 524 | | Prior Custom v1 526 | | New Standard v2 534 | | New Custom v2 536 | |
| --- | --- | --- | --- | --- | --- | --- | --- |
| Ancestor | Descendt | Ancestor | Descendt | Ancestor | Descendt | Ancestor | Descendt |
| A | A1 | A | A1 | A | A1 | A | A1 |
| A | A1 | $A^a$ | A1 | A | A1 | $A^a$ | A1 |

TABLE 2-continued

| Prior Standard v1 524 | | Prior Custom v1 526 | | New Standard v2 534 | | New Custom v2 536 | |
| --- | --- | --- | --- | --- | --- | --- | --- |
| Ancestor | Descendt | Ancestor | Descendt | Ancestor | Descendt | Ancestor | Descendt |
| A | A1 | A | $A1^b$ | A | A1 | A | $A1^b$ |
| A | A1 | $A^a$ | $A1^b$ | A | A1 | $A^a$ | $A1^b$ |
| A | A1 | A | A1 | $A^c$ | A1 | $A^c$ | A1 |
| A | A1 | A | A1 | A | $A1^d$ | A | $A1^d$ |
| A | A1 | A | A1 | $A^c$ | $A1^d$ | $A^c$ | $A1^d$ |
| A | A1 | $A^a$ | A1 | $A^c$ | A1 | $A^{ac}$ | A1 |
| A | A1 | A | $A1^b$ | A | $A1^d$ | A | $A1^{bd}$ |
| A | A1 | $A^a$ | $A1^b$ | $A^c$ | $A1^d$ | $A^{ac}$ | $A1^{bd}$ |

In the first four rows of Table 2, the ancestor and descendant in the new standard repository 534 have not been modified. The upgrade of the ancestor and descendant in the prior custom repository 526 with their corresponding ancestors and descendants in the prior and new standard repositories 524 and 534 creates the same (custom) ancestor and descendant in the new custom repository 536. In the fifth through seventh rows of Table 2, the ancestor and descendant in the prior custom repository 526 have not been modified but the corresponding ancestor and/or descendant in the new standard repository 534 have been modified. The upgrade of the ancestor and descendant in the prior custom repository 526 with their corresponding ancestors and descendants in the prior and new standard repositories 524 and 534 creates ancestor and descendant in the new custom repository 536 having the new features included in the corresponding ancestor and descendant in the new standard repository 534.

In the eight through tenth row of Table 2, the ancestor and/or descendant in the prior custom repository 526 have been modified, and the corresponding ancestor and/or descendant in the new standard repository 534 have also been modified. There are three different versions of the ancestor or descendant in repositories 524, 526, and 534. For example, in the eight row, ancestors A, $A^a$, and $A^c$ are included in repositories 524, 526, and 534, respectively. In an embodiment, the upgrade of ancestor $A^a$ in the prior custom repository 526 with ancestors A and $A^c$ in the prior and new standard repositories 524 and 534 creates the ancestor $A^{ac}$ in the new custom repository 536 having the customized and upgraded features, which are denoted as "$a$" and "$c$" respectively.

In the embodiment shown in Table 2, the descendant in the new custom repository is created by upgrading the descendant in the prior custom repository with the corresponding descendants in the prior and new standard repositories. Modifications in the ancestors of these descendants were not propagated to the upgraded descendant.

Table 3 describes the upgrade inherency logic for an upgrade scheme whereby upgrades in the ancestor in the new standard repository v2 are propagated down to the descendant in the new custom repository v2 even when corresponding descendants exist in the prior and new standard repositories, in accordance with yet another upgrade inherency scheme of the invention. In this upgrade inherency scheme, a descendant is upgraded with modifications in its ancestor in the new standard repository as well as modifications in its corresponding descendants, if these corresponding descendants exist.

TABLE 3

| Prior Standard v1 524 | | Prior Custom v1 526 | | New Standard v2 534 | | New Custom v2 536 | |
| --- | --- | --- | --- | --- | --- | --- | --- |
| Ancestor | Descendt | Ancestor | Descendt | Ancestor | Descendt | Ancestor | Descendt |
| A | A1 | A | A1 | A | A1 | A | A1 |
| A | A1 | $A^a$ | A1 | A | A1 | $A^a$ | A1 |
| A | A1 | A | $A1^b$ | A | A1 | A | $A1^b$ |
| A | A1 | $A^a$ | $A1^b$ | A | A1 | $A^a$ | $A1^b$ |
| A | A1 | A | A1 | $A^c$ | A1 | $A^c$ | $A1^c$ |
| A | A1 | A | A1 | A | $A1^d$ | A | $A1^d$ |
| A | A1 | A | A1 | $A^c$ | $A1^d$ | $A^c$ | $A1^{cd}$ |
| A | A1 | $A^a$ | A1 | $A^c$ | A1 | $A^{ac}$ | $A1^c$ |
| A | A1 | A | $A1^b$ | A | $A1^d$ | A | $A1^{bd}$ |
| A | A1 | $A^a$ | $A1^b$ | $A^c$ | $A1^d$ | $A^{ac}$ | $A1^{bcd}$ |

In Table 3, the ancestor in the prior custom repository v1 is upgraded in similar manner as that described above for Table 2 to provide the upgraded ancestor in the new custom repository shown in the second to last column in Table 3. The descendant in the prior custom repository v1 can be upgraded via a two-step process. In the first step, the descendant in the prior custom repository v1 is first upgraded with the corresponding descendants in the prior and new standard repositories v1 and v2 to generate an "intermediate" descendant for the new custom repository v2. This first upgrade can be achieved as described above for Table 2. The intermediate descendant in the new customer repository v2 is as shown in the last column in Table 2. The intermediate descendant in the new custom repository v2 is next upgraded with modifications in the descendant's ancestor in the new standard repository to generate the final upgraded descendant for the new custom repository v2. This second upgrade can be achieved by upgrading the intermediate descendant (shown in the last column of Table 2) with the descendant's ancestor in the new standard repository v2 (shown in the fifth column in Table 3) to create the final upgraded descendant (shown in the last column in Table 3).

In rows 1 through 4, 6, and 9 of Table 3, since there have been no modifications to the ancestor in the new standard repository, the second upgrade to the descendant in the new custom repository yields no additional features. And in rows 5, 7, 8, and 10 of Table 3, the ancestor in the new standard repository v2 include modifications, and the upgrade of the intermediate descendant with the ancestor in the new standard repository v2 generates the final upgraded descendant shown (in bold) in Table 3 having new features from this ancestor.

Various options can be provided to achieve results different from those shown in Table 3. In one embodiment, if the three descendants in the prior custom repository and the prior and new standard repositories are the same, such as for rows 5 and 8 in Table 3, then the modifications in the ancestor in the new standard repository are not propagated to the upgraded descendant. A simple rational for not propagating the modifications from the ancestor in this case is that the descendant may have been intended to remain unchanged. Moreover, the modifications in the ancestor may be applied to the upgraded descendant via another separate operation.

In Table 3, modifications in the ancestor in the new standard repository are propagated to the descendant in the new custom repository, but modifications in the ancestor in the prior custom repository are not applied to the descendant.

Table 4 describes the upgrade inherency logic for an upgrade scheme whereby modifications in the ancestors in the new standard repository v2 and the prior custom repository v1 as well as modifications in the corresponding descendants are propagated to the descendant in the new custom repository v2, even when corresponding descendants exist in the prior and new standard repositories, in accordance with yet another upgrade inherency scheme of the invention.

second to last column in Table 4) to create the final upgraded descendant (shown in the last column in Table 4).

In rows 1, 3, 6, and 9 of Table 4, since there have been no modifications to the ancestor in the new standard repository v2 or the prior custom repository v1, the second upgrade to the intermediate descendant in the new custom repository yields no additional features. And in rows 2, 4, 5, 7, 8, and 10 of Table 4, the ancestors in the new standard repository v2 and/or the prior custom repository v1 include modifications, and the upgrade of the intermediate descendant with the upgraded ancestor in the new standard repository v2 generates the final upgraded descendant shown (in bold) in Table 4 having new features from the ancestors.

The propagation of the modifications in the ancestors in the custom repository and/or the new standard repository down to the descendant can be selectively enabled or disabled via a configuration option provided by an Option menu.

In an embodiment, one custom repository is maintained for the software application. In some other embodiments, multiple custom repositories may be supported. This may be achieved by providing an attribute (e.g., a Repository ID field) that identifies the specific repository to which the object belongs. Thereafter, each repository may be upgraded based on any of the embodiments and schemes described above. For example, the modifications in the ancestor in the prior custom repository may be propagated down to the descendant in the new custom repository only for certain specific prior custom repositories, which may have been selected via configuration options. The upgrade may also be achieved via separate steps.

TABLE 4

| Prior Standard v1 524 | | Prior Custom v1 526 | | New Standard v2 534 | | New Custom v2 536 | |
| --- | --- | --- | --- | --- | --- | --- | --- |
| Ancestor | Descendt | Ancestor | Descendt | Ancestor | Descendt | Ancestor | Descendt |
| A | A1 | A | A1 | A | A1 | A | A1 |
| A | A1 | $A^a$ | A1 | A | A1 | $A^a$ | $A1^a$ |
| A | A1 | A | $A1^b$ | A | A1 | A | $A1^b$ |
| A | A1 | $A^a$ | $A1^b$ | A | A1 | $A^a$ | $A1^{ab}$ |
| A | A1 | A | A1 | $A^c$ | A1 | $A^c$ | $A1^c$ |
| A | A1 | A | A1 | A | $A1^d$ | A | $A1^d$ |
| A | A1 | A | A1 | $A^c$ | $A1^d$ | $A^c$ | $A1^{cd}$ |
| A | A1 | $A^a$ | A1 | $A^c$ | A1 | $A^{ac}$ | $A1^{ac}$ |
| A | A1 | A | $A1^b$ | A | $A1^d$ | A | $A1^{bd}$ |
| A | A1 | $A^a$ | $A1^b$ | $A^c$ | $A1^d$ | $A^{ac}$ | $A1^{abcd}$ |

In Table 4, the ancestor in the prior custom repository v1 is upgraded in similar manner as that described above for Table 2 to provide the upgraded ancestor in the new custom repository shown in the second to last column in Table 4. The descendant in the prior custom repository v1 can be upgraded via a two-step process. In the first step, the descendant in the prior custom repository v1 is first upgraded with the corresponding descendants in the prior and new standard repositories v1 and v2 to generate the intermediate descendant for the new custom repository v2. This first upgrade can be achieved as described above for Table 2. The intermediate descendant in the new customer repository v2 is as shown in the last column in Table 2. The intermediate descendant in the new custom repository v2 is next upgraded with modifications in the descendant's ancestors in the prior custom repository v1 and the new standard repository v2 to generate the final upgraded descendant for the new custom repository v2. This second upgrade can be achieved by upgrading the intermediate descendant (shown in the last column of Table 2) with the upgraded ancestor of the descendant (shown in the In an embodiment, the Upgrade Ancestor property is available and supported for certain objects in a repository (e.g., top-level objects). For certain software implementations, the top-level objects may include applets, reports, business components, integration objects, and others. For example, the Opportunities form 222 in FIG. 2 may be rendered by a top-level object. The top-level object may include one or more children, each of which may further include one or more children, as shown in FIG. 3A. In an embodiment, when a top-level object is replicated to create another object in the custom repository, the top-level object and its children are copied. In an embodiment, the replicated top-level object and its children are each upgraded as described above (i.e., the upgrade is performed at all levels). In an embodiment, the child objects in the hierarchical structure are each upgraded based on the same upgrade inherency scheme used for the top-level object. The upgrade may be performed if appropriately enabled (e.g., by including the name of the ancestor in the Upgrade Ancestor field and/or via configuration options).

As noted above, various types of upgrade inherency schemes may also be implemented. The number of levels of inherency supported determines the particular reference object to be used for the comparison during an upgrade. This then determines the comparison results and the upgrade outcome.

If one level of inherency is supported, a replicated object is upgraded based on the ancestor identified in the Upgrade Ancestor field. And if the identified ancestor is not found in the new standard repository, then the replicated object is not upgraded. This situation may arise, for example, if a replicated object has been copied a second time, the second copy identifies the first copy as the upgrade ancestor, and the first copy does not have a corresponding object in the new standard repository. For the example shown in FIG. 3C, if one level of inherency is supported, then all objects directly or indirectly copied from object A reference object A as the upgrade ancestor.

If multiple levels of inherency are supported, then a replicated object may be upgraded based on the upgrade ancestor identified in the Upgrade Ancestor field, which may further be upgraded based on its upgrade ancestor. In one upgrade implementation, the higher layer objects may be upgraded first, and the descendants and their descendants may thereafter be upgraded. If multiple levels of inherency are supported, then modifications made to an ancestor object propagate to the descendants. For the example shown in FIG. 3C, object A2 may reference object A1 as the upgrade ancestor, which may further reference object A as the upgrade ancestor. During the upgrade, object A may be upgraded first, object A1 may be upgraded next, and object A2 may be upgraded after that. Any modifications made to object A are propagated to objects A1 and A2, and any modifications made to object A1 are propagated to object A2.

In an embodiment, the Upgrade Ancestor field on objects in the standard repository is implemented as a read-only field, and is filled with a null value. In an embodiment, when an object is created or replicated, the name of the ancestor from which the copy was made is automatically included in the Upgrade Ancestor field of the replicated object. This automatic prefill of the Upgrade Ancestor field may be enabled by certain configuration option in the Option menu. In another embodiment, the user is able to enter the identity of a specific ancestor in the Upgrade Ancestor field. A list column of objects (e.g., those previously created or copied by the user) may be provided as possible upgrade ancestor candidates for the Upgrade Ancestor field.

Implementation of the Upgrade Process

An Application Upgrader may be provided to upgrade the objects in the custom repository. The Application Upgrader may be implemented in various manner and utilize various processing schemes. An overall process performed by the Application Upgrader for a repository upgrade is provided below.

Figure 6:
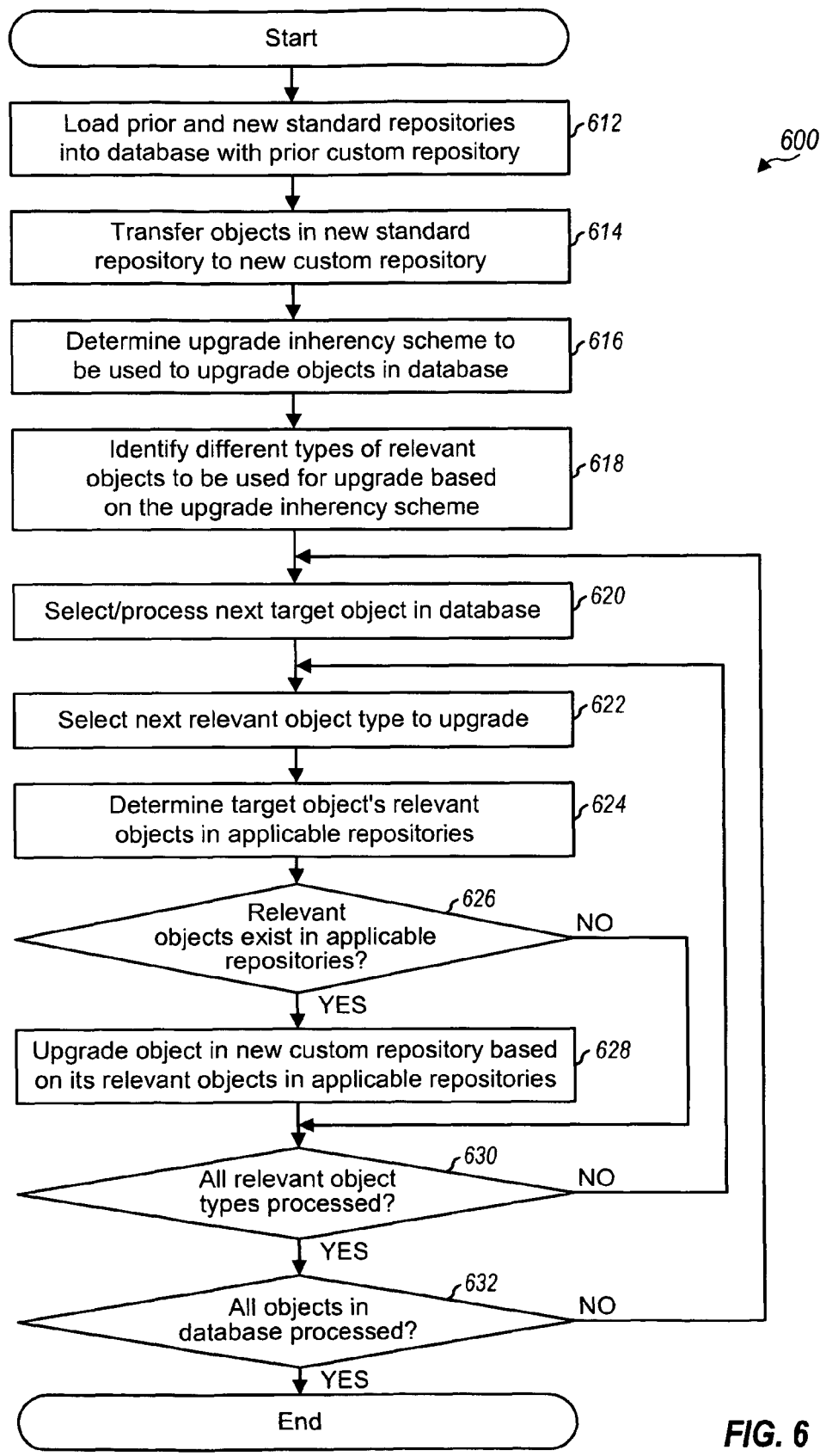
FIG. 6 is a flow diagram of an upgrade process in accordance with a specific embodiment of the invention.

FIG. 6 is a flow diagram of an upgrade process 600, in accordance with a specific embodiment of the invention. Initially, the prior and new standard repositories are loaded into a database, e.g., one that also stores the prior custom repository, at step 612. As noted above, the prior and new standard repositories may be provided within files shipped with the software application. To create a new custom repository for a new software version, the objects in the new standard repository are first transferred to the new standard repository, at step 614.

A particular upgrade inherency scheme to be used for the upgrade is also determined, at step 616. The scheme may be any one of the schemes described above (e.g., upgrade descendant with ancestor in new standard repository only if corresponding descendant do not exist, upgrade descendant with ancestor in new standard repository even if corresponding descendant does exist, upgrade descendant with ancestors in prior custom and new standard repositories, one level, multi-level, and so on). Depending on the upgrade inherency scheme to be used, different types of "relevant" objects to be used for the upgrade are identified, at step 618. The relevant objects are those that will be used to upgrade an object (i.e., a "target" object). The different relevant object types may include (1) corresponding objects in the prior and new standard repositories, (2) ancestor objects in the prior and new standard repositories, and (3) ancestor object in the prior custom repository. The ancestors for a target object can be determined by consulting the Upgrade Ancestor field of the target object.

One or more of these relevant object types may be processed, depending on the particular upgrade inherency scheme to be used and possibly on the existence of the relevant objects in the database. For example, in one scheme, objects are only upgraded with their corresponding objects (type 1) if these exist, and with ancestors in the prior and new standard repositories (type 2) only if corresponding objects do not exist. And for the scheme in which modifications to the ancestor in the prior custom repository are propagated to the descendant, all three types may be used to upgrade the target object. Thus, the objects deemed as relevant in the upgrade of the target object are determined based on the particular upgrade inherency scheme to be used.

Each object in the database is then identified and processed, at step 620. For each object in the database, each type of relevant objects to be used for the upgrade is identified, at step 622. For example, the first type of relevant objects to be processed is typically the corresponding objects in the prior and new standard repositories. In this case, the corresponding objects (e.g., ones with the same name as the target object) in the prior and new standard repositories are determined, at step 624.

A determination is then made whether the relevant objects (e.g., the corresponding objects) exist in the applicable (e.g., prior and new standard repositories) repositories, at step 626. If the answer is yes, then the target object is upgraded with the relevant objects in the applicable repositories, at step 628. Otherwise, if the relevant objects do not exist, then step 628 is bypass.

A determination is then made whether or not all relevant object types have been considered, at step 630. If no corresponding objects are found for the target object, then the ancestors in the prior and new standard repositories are considered as the next type to be processed. And for a scheme in which modifications to ancestors in the prior and new standard repositories are propagated to descendant even if there are corresponding objects for the descendant, then these ancestors are also considered as the next relevant object type to be processed. The process then returns to step 622 to process the next relevant object type. Steps 622 through 630 are repeated for each relevant object type to be considered in the upgrade of the target object.

At step 632, a determination is made whether or not all objects in the database have been processed. If the answer is no, the process returns to step 620 and the next object in the database is selected to be upgraded. Steps 620 through 632 are repeated for each object in the database.

Back at step 626, if the target object is only found in the prior custom repository, this object is either a newly created object or a renamed object. In either case, the object can be copied to the new custom repository. And if the target object is not found in the prior custom repository, this object is likely an object in the prior standard repository that was either deleted from the prior custom repository or renamed. If the object is one that has been deleted, a check can be made to ensure that the object is of the type that may be deleted. This verification may be achieved by checking certain attributes of the object. And if the object is of the type that may be deleted, then the object is removed from the new custom repository. Otherwise, the object is retained in the new custom repository. If the object is one that has been renamed, the renamed object will be found later and copied to the new custom repository.

In an embodiment, a table is maintained to list the ancestors and their descendants. During normal use of a software application, an object may be replicated many times and many descendants may be created based on the same ancestor. During the upgrade process, the table can thus be implemented to identify each ancestor and its descendants (i.e., a one-to-many relationship). The table may further identify whether the ancestor has been updated. If the ancestor has been updated, the descendant may be updated at this time based on the updated ancestor. Otherwise, the ancestor may be upgraded at a later time and its descendants can be upgraded thereafter. The upgrade processing for the objects may also be performed at the end. Alternatively, the table can include the descendants as they are found and their associated ancestors (i.e., one-to-one relationships).

The upgrade of an object in the custom repository with relevant objects (e.g., corresponding objects and/or associated ancestors) may be achieved by first determining (1) the differences between this object and its relevant object in the prior standard repository (i.e., to determine modifications made by the user), and (2) the difference between the relevant objects in the prior and new standard repositories (i.e., to determine modifications made in the new software version). The differences may be determined by performing a comparison between the attributes for the objects being compared, e.g., attribute-by-attribute. Depending on the particular upgrade scheme being implemented, the object in the prior custom repository may then be upgraded by any combination of the determined differences. As noted above, additional control (i.e., child object) may have been added to an object. In that case, the additional control or child object may also be added to the identified object being upgraded.

Figure 7:
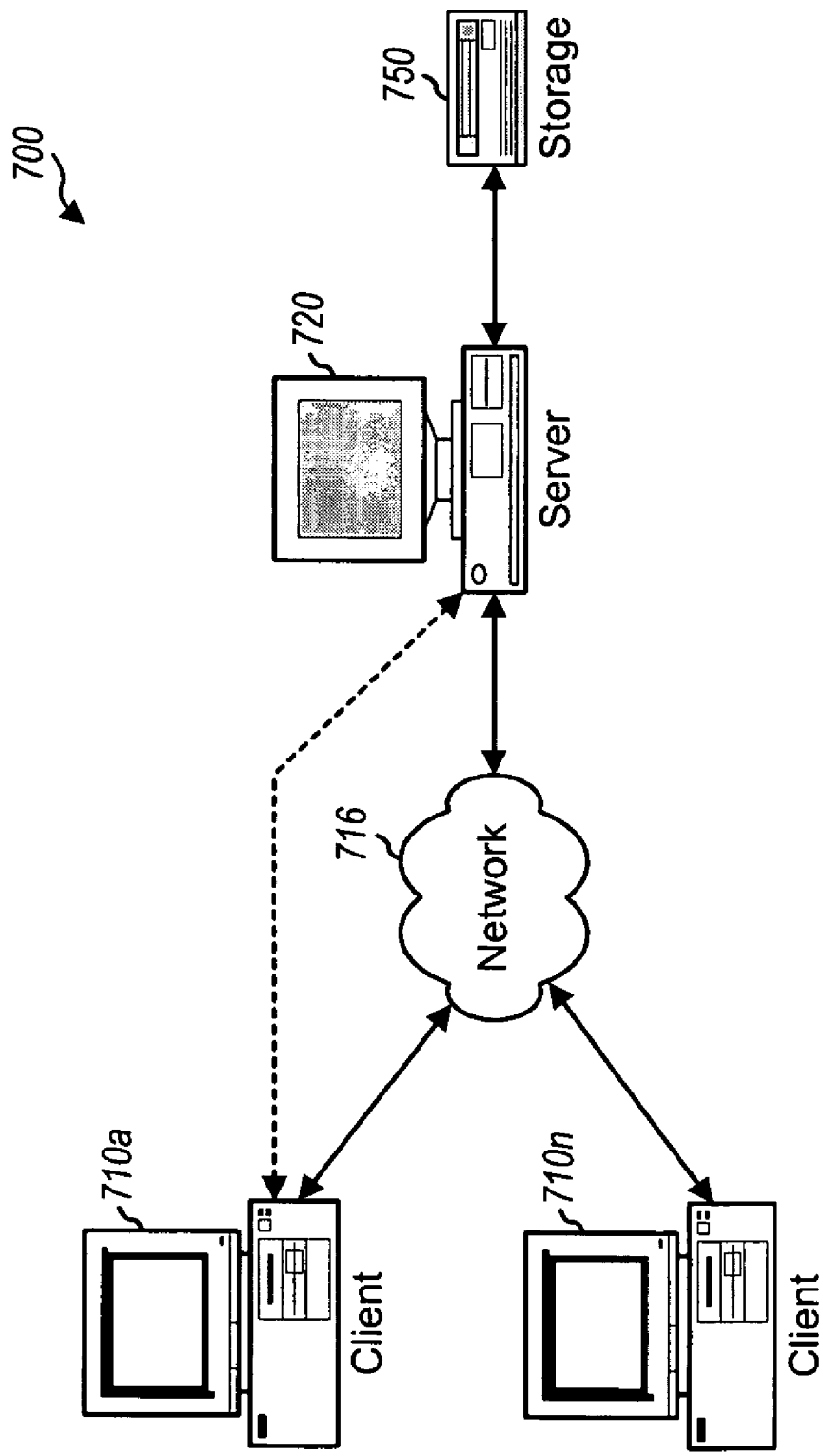
FIG. 7 is a diagram of a system capable of implementing various aspects of the invention.

FIG. 7 is a diagram illustrating a physical view of a system 700 capable of implementing various aspects of the invention. System 700 includes one or more clients 710 coupled to an application server 720 either via a computer network 716 (e.g., the Internet, an intranet, or some other network) or directly (as shown by the dashed line). For a distributed design, server 720 may implement a portion of runtime engines 110 in FIG. 1 (e.g., object manager 114 and data manager 116) and client 710 may implement the remainder portion of runtime engines 110 (e.g., user interface 112 and possibly a portion of object manager 114). And for an integrated design, runtime engines 110 may be implemented entirely within client 710 or server 720. Storage 750 implements database 140, which may be used to store objects in the standard and custom repositories.

The tools application used to copy, modify, and create objects may be implemented in client 710 or server 720. Similarly, the Application Upgrader used to perform the repository upgrade, as described herein, may be implemented in either client 710 or server 720, or both.

Figure 8:
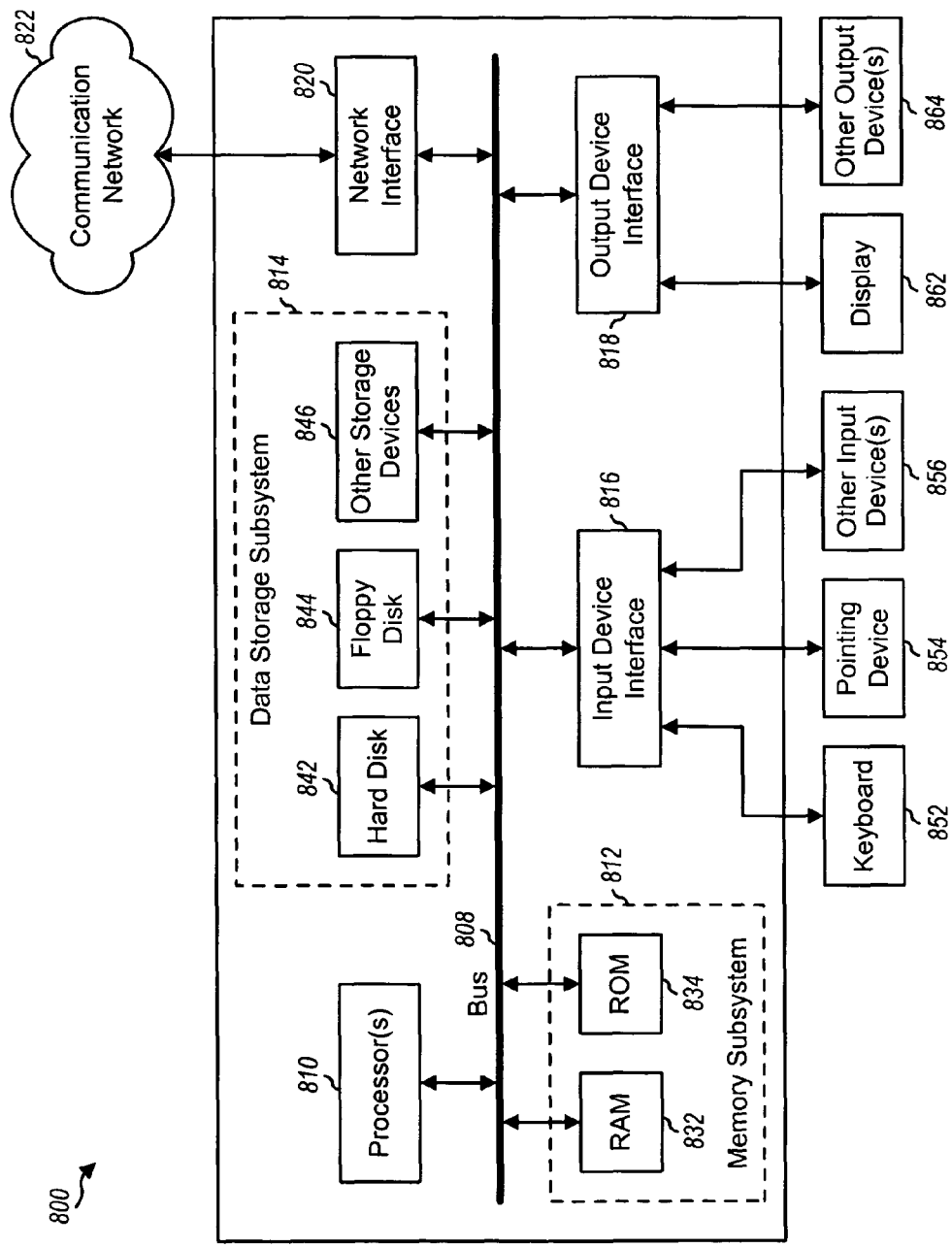
FIG. 8 is a block diagram of a computer system.

FIG. 8 is a block diagram of an embodiment of a computer system 800 that may be used to implement client 710 and server 720 in FIG. 7. System 800 includes a bus 808 that interconnects major subsystems such as one or more processors 810, a memory subsystem 812, a data storage subsystem 814, an input device interface 816, an output device interface 818, and a network interface 820. Processor(s) 810 perform many of the processing functions for system 800 and communicate with a number of peripheral devices via bus 808.

Memory subsystem 812 may include a RAM 832 and a ROM 834 used to store codes and data that implement various aspects of the invention. In a distributed environment, the program codes and data may be stored on a number of computer systems and used by the processors of these systems. Data storage subsystem 814 provides non-volatile storage for program codes and data, and may include a hard disk drive 842, a floppy disk drive 844, and other storage devices 846 such as a CD-ROM drive, an optical drive, and removable media drive.

Input device interface 816 provides interface with various input devices such as a keyboard 852, a pointing device 854 (e.g., a mouse, a trackball, a touch pad, a graphics tablet, a scanner, or a touch screen), and other input device(s) 856. Output device interface 818 provides an interface with various output devices such as a display 862 (e.g., a CRT or an LCD) and other output device(s) 864. Network interface 820 provides an interface for system 800 to communicate with other computers coupled to communication network 822.

Many other devices or subsystems (not shown) may also be coupled to system 800. In addition, it is not necessary for all of the devices shown in FIG. 8 to be present to practice the invention. Furthermore, the devices and subsystems may be interconnected in configurations different from that shown in FIG. 8. One or more of the storage devices may be located at remote locations and coupled to system 800 via communication network 822. The operation of a computer system such as that shown in FIG. 8 is readily known in the art and not described in detail herein. The source codes to implement certain embodiments of the invention may be operatively disposed in memory subsystem 812 or stored on storage media such as a hard disk, a floppy disk, or a CD-ROM that is operative with a CD-ROM player.

The foregoing description of the specific embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein, and as defined by the following claims.

What is claimed is:

1. A method comprising:
adding a first attribute to a first data object in a standard repository of data objects, wherein the first data object is identified by a first name;
in response to the adding the first attribute to the first data object,
adding the first attribute to each data object identified by the first name in a customized repository of data objects;
identifying each object, in the customized repository, that comprises an upgrade ancestor field that includes a value of the first name; and
in response to the adding the first attribute to the first data object, and in response to the identifying,
adding, using a processor, the first attribute to the each data object that comprises an upgrade ancestor field that includes a value of the first name.

2. The method of claim 1 further comprising:
adding a second attribute to a second data object in the standard repository, wherein the second data object is identified by a second name, and wherein the first and second names are distinct from each other;
in response to the adding the second attribute to the second data object,
   adding the second attribute to each data object identified by the second name in the customized repository; and
in response to the adding the second attribute to the second data object,
   adding the second attribute to each data object, in the customized repository, that comprises an upgrade ancestor field that includes a value of the second name.

3. The method of claim 1 further comprising:
adding second and third attributes to a second data object in the standard repository, wherein the second data object is identified by a second name, and wherein the first and second names are distinct from each other;
in response to the adding the second and third attributes to the second data object,
   adding the second and third attributes to each data object identified by the second name in the customized repository; and
in response to the adding the second and third attributes to the second data object,
   adding the second and third attributes to each data object, in the customized repository, that comprises an upgrade ancestor field that includes a value of the second name.

4. The method of claim 1 wherein the first attribute, when displayed on a computer system monitor, comprises a field into which data can be added.

5. The method of claim 1 further comprising:
identifying each object, in the customized repository, that
   is identified by a name different from the first name, and
   comprises an upgrade ancestor field lacking the first name,
wherein the adding the first attribute to the each data object that comprises an upgrade ancestor field that includes a value of the first name is performed in response to the identifying each object that
   is identified by a name different from the first name, and
   comprises an upgrade ancestor field lacking the first name 6. A method comprising:
in response to an object upgrade, adding a first attribute to each data object identified by a first name in a repository of data objects;
in response to the object upgrade, identifying each object, in the repository, that comprises an upgrade ancestor field that includes a value of the first name; and
adding, using a processor, the first attribute to each data object, in the repository, that is not identified by the first name, but comprises upgrade ancestor information that includes the first name.

7. The method of claim 6 further comprising:
adding a second attribute to each data object identified by a second name in the repository, wherein the first and second names are distinct from each other; and
adding the second attribute to each data object, in the repository, that is not identified by the second name, but comprises upgrade ancestor information that includes the second name.

8. The method of claim 6 further comprising:
adding second and third attributes to each data object identified by a second name in the repository, wherein the first and second names are distinct from each other; and
adding the second and third attributes to each data object, in the repository, that is not identified by the second name, but comprises upgrade ancestor information that includes the second name.

9. The method of claim 6 wherein the first attribute, when displayed on a computer system monitor, comprises a field into which data can be added.

10. The method of claim 6 further comprising:
comparing the first name with respective names of each data object in the repository, wherein the first attribute is added to each data object in the repository whose name compares equally to the first name; and
comparing the first name with respective names included in the upgrade ancestor information of each data object in the repository.

11. A non-transitory computer readable medium comprising instructions executable by a computer system, wherein the computer system implements a method in response to executing the instructions, the method comprising:
in response to an object upgrade, a first upgrading of each data object, in a customized repository of data objects, that
   is identified by a first name;
in response to the object upgrade, identifying each data object, in the customized repository, that
   is identified by a name other than the first name, and
   comprises upgrade ancestor information that includes the first name; and
a second upgrading of the each data object that
   is identified by a name other than the first name, and
   comprises upgrade ancestor information that includes the first name.

12. The computer readable medium of claim 11 wherein:
the first upgrading comprises adding a first attribute to the each data object identified by the first name, and
the second upgrading comprises adding the first attribute to the each data object that is identified by other than the first name, and
   comprises upgrade ancestor information that includes the first name.

13. The computer readable medium of claim 12 wherein the method further comprises:
adding a second attribute to each data object, in the customized repository, that is identified by a second name, wherein the first and second names are distinct from each other; and
adding the second attribute to each data object, in the customized repository, that comprises upgrade ancestor information that includes the second name.

14. The computer readable medium of claim 12 wherein the method further comprises:
adding second and third attributes to each data object, in the customized repository, that is identified by a second name; and
adding the second and third attributes to each data object, in the customized repository, that comprises an upgrade ancestor field that includes a value of the second name.

15. The computer readable medium of claim 12 wherein the first attribute, when displayed on a computer system monitor, comprises a field into which data can be added.

16. A method comprising:
in response to an object upgrade, adding a first attribute to a first data object in a standard repository of data objects, wherein the first data object is identified by a first name;
in response to an object upgrade, identifying each object, in a customized repository of data objects, that
is identified by a name different from the first name, and
comprises an upgrade ancestor field lacking the first name; and
in response to the adding the first attribute to the first data object, and in response to the identifying,
adding the first attribute to each data object, in the customized repository, identified by the first name, and
adding, using a processor, the first attribute to each data object, in the customized repository, that comprises an upgrade ancestor field that includes a value of the first name.

* * * * *

UNITED STATES PATENT AND TRADEMARK OFFICE
CERTIFICATE OF CORRECTION

PATENT NO.         : 8,091,081 B2                                               Page 1 of 1
APPLICATION NO.    : 11/400797
DATED              : January 3, 2012
INVENTOR(S)        : Thorson et al.

It is certified that error appears in the above-identified patent and that said Letters Patent is hereby corrected as shown below:

In column 8, line 17, delete "Aacand" and insert -- Aac and --, therefor.

In column 21, line 48, in Claim 5, after "name" insert -- . --.

Signed and Sealed this
Twenty-seventh Day of March, 2012

David J. Kappos
*Director of the United States Patent and Trademark Office*